United States Patent
Garcia

(10) Patent No.: US 10,588,443 B2
(45) Date of Patent: Mar. 17, 2020

(54) SMART SLOW COOKER

(71) Applicant: CE Brands, LLC, Miami, FL (US)

(72) Inventor: Jorge Garcia, Rogers, AR (US)

(73) Assignee: CE BRANDS, LLC, Miami, FL (US)

( * ) Notice: Subject to any disclaimer, the term of this patent is extended or adjusted under 35 U.S.C. 154(b) by 72 days.

(21) Appl. No.: 15/450,978

(22) Filed: Mar. 6, 2017

(65) Prior Publication Data

US 2017/0251858 A1 Sep. 7, 2017

Related U.S. Application Data

(60) Provisional application No. 62/304,016, filed on Mar. 4, 2016.

(51) Int. Cl.
| | |
|---|---|
| *A47J 27/00* | (2006.01) |
| *A47J 27/62* | (2006.01) |
| *H05B 1/02* | (2006.01) |
| *A47J 36/32* | (2006.01) |

(52) U.S. Cl.
CPC .............. *A47J 27/004* (2013.01); *A47J 27/62* (2013.01); *A47J 36/32* (2013.01); *H05B 1/0261* (2013.01)

(58) Field of Classification Search
CPC .......... A47J 27/004; A47J 27/62; A47J 36/32; H05B 1/0261
USPC ........................................................ 219/433
See application file for complete search history.

(56) References Cited

U.S. PATENT DOCUMENTS

| | | | | |
|---|---|---|---|---|
| 3,177,319 A | * | 4/1965 | Komatsu | A47J 27/004 219/385 |
| 3,393,295 A | * | 7/1968 | Jepson | A47J 27/004 219/386 |
| 3,550,657 A | * | 12/1970 | Swanke | A47J 42/26 241/199.1 |
| 3,875,854 A | * | 4/1975 | Wassenaar | A47J 27/62 99/332 |
| 4,039,777 A | * | 8/1977 | Baker | A47J 27/004 219/439 |
| 4,084,406 A | * | 4/1978 | Brenneman | F04D 27/0284 318/779 |
| 4,362,923 A | * | 12/1982 | Aoshima | A47J 27/62 219/435 |
| 4,366,501 A | * | 12/1982 | Tsunekawa | H04N 1/0044 348/E5.024 |
| 4,658,304 A | * | 4/1987 | Tsunekawa | H04N 1/0044 348/E5.024 |
| 5,065,073 A | * | 11/1991 | Frus | F02P 3/0869 123/634 |
| 5,079,784 A | * | 1/1992 | Rist | A61H 33/005 219/492 |
| 5,111,026 A | * | 5/1992 | Ma | A47J 27/62 219/442 |
| 5,148,084 A | * | 9/1992 | Frus | F02P 3/0869 123/146.5 R |
| 5,191,435 A | * | 3/1993 | Tsunekawa | H04N 1/0044 348/E5.024 |

(Continued)

*Primary Examiner* — Eric S Stapleton
(74) *Attorney, Agent, or Firm* — Trueba & Suarez PLLC; William R. Trueba, Jr.; Roberto M. Suarez

(57) ABSTRACT

The invention disclosed herein is directed to a smart slow cooker, system, and related methods for heating food to at least 50 degrees centigrade within at most two hours, then adjusting the power to a lower setting for the remainder of the desired cooking time.

6 Claims, 1 Drawing Sheet

(56) References Cited

U.S. PATENT DOCUMENTS

| | | | | |
|---|---|---|---|---|
| 5,235,903 A | * | 8/1993 | Tippmann | A21B 3/04 126/20 |
| 5,240,725 A | * | 8/1993 | Akamatsu | A47J 27/62 426/233 |
| 5,245,252 A | * | 9/1993 | Frus | F02P 3/0869 123/634 |
| 5,300,757 A | * | 4/1994 | Hara | G05D 23/1917 219/491 |
| 5,519,644 A | * | 5/1996 | Benton | G01K 1/026 374/132 |
| 5,544,567 A | * | 8/1996 | Davis | A47J 27/62 99/336 |
| 5,567,458 A | * | 10/1996 | Wu | A47J 27/004 219/433 |
| 5,586,487 A | * | 12/1996 | Marino | A47J 27/04 99/330 |
| 5,608,383 A | * | 3/1997 | Neil | G08B 21/182 340/588 |
| 5,744,783 A | * | 4/1998 | You | A47J 27/62 219/492 |
| 5,746,114 A | * | 5/1998 | Harris | F24C 7/082 99/331 |
| 5,767,487 A | * | 6/1998 | Tippmann | A23B 4/0526 219/440 |
| 5,923,367 A | * | 7/1999 | Tsunekawa | H04N 1/0044 348/207.99 |
| 6,283,014 B1 | * | 9/2001 | Ng | A47J 27/0802 219/431 |
| 6,545,252 B2 | * | 4/2003 | Wang | A47J 27/004 219/430 |
| 6,580,056 B1 | * | 6/2003 | Tacha | B01L 7/00 219/440 |
| 6,735,926 B1 | * | 5/2004 | Louviere | B29C 45/26 156/308.4 |
| 7,030,925 B1 | * | 4/2006 | Tsunekawa | H04N 5/23293 348/231.99 |
| 7,041,941 B2 | * | 5/2006 | Faries, Jr. | A61M 5/445 219/413 |
| 7,167,642 B1 | * | 1/2007 | Wagner | A47J 27/004 392/441 |
| 7,227,107 B2 | * | 6/2007 | McLemore | A47J 36/32 219/481 |
| 7,276,675 B2 | * | 10/2007 | Faries, Jr. | A61M 5/445 219/413 |
| 7,326,882 B2 | * | 2/2008 | Faries, Jr. | A61F 7/0241 219/400 |
| 7,451,692 B2 | * | 11/2008 | Baraille | A47J 27/0802 219/440 |
| 7,484,455 B2 | * | 2/2009 | De'Longhi | A47J 27/004 219/436 |
| 7,718,928 B2 | * | 5/2010 | He | A47J 27/09 219/431 |
| 8,067,717 B2 | * | 11/2011 | McLemore | A47J 36/32 219/492 |
| 8,151,786 B2 | * | 4/2012 | May | F24C 3/126 126/214 D |
| 8,561,525 B2 | * | 10/2013 | Bauchot | A47J 27/0802 219/440 |
| 8,878,103 B2 | * | 11/2014 | Naylor | F24H 1/185 219/213 |
| 8,896,215 B2 | * | 11/2014 | Reed | H05B 37/0281 315/126 |
| 9,290,890 B2 | * | 3/2016 | Naylor | E01C 11/265 |
| 9,392,646 B2 | * | 7/2016 | Caterina | F24D 13/024 |
| 9,877,526 B2 | * | 1/2018 | Haas | A41D 13/0051 |
| 2001/0050005 A1 | * | 12/2001 | Wang | A47J 27/004 99/422 |
| 2005/0178274 A1 | * | 8/2005 | Cartigny | A47J 27/0813 99/337 |
| 2006/0016799 A1 | * | 1/2006 | Klask | H05B 3/683 219/445.1 |
| 2006/0091137 A1 | * | 5/2006 | McLemore | A47J 36/32 219/708 |
| 2007/0000909 A1 | * | 1/2007 | Liebold | H05B 3/746 219/506 |
| 2008/0120335 A1 | * | 5/2008 | Dolgoff | G05B 15/02 |
| 2008/0169280 A1 | * | 7/2008 | Barnes | A47J 27/004 219/412 |
| 2009/0114633 A1 | * | 5/2009 | Naylor | H05B 1/0236 219/213 |
| 2009/0114634 A1 | * | 5/2009 | Naylor | H05B 1/0244 219/213 |
| 2010/0230397 A1 | * | 9/2010 | Ohashi | A21B 3/04 219/401 |
| 2010/0271909 A1 | * | 10/2010 | Michaelson | G04F 10/00 368/108 |
| 2011/0147374 A1 | * | 6/2011 | Obst | A47J 36/2438 219/647 |
| 2012/0012010 A1 | * | 1/2012 | Baraille | A47J 27/09 99/325 |
| 2012/0048843 A1 | * | 3/2012 | Feng | A47J 27/004 219/442 |
| 2013/0026156 A1 | * | 1/2013 | Naylor | H05B 1/0244 219/509 |
| 2013/0052310 A1 | * | 2/2013 | Stanford | A47J 27/62 426/231 |
| 2015/0020693 A1 | * | 1/2015 | French | A47J 27/12 99/340 |
| 2015/0068409 A1 | * | 3/2015 | Tanaka | A47J 27/004 99/348 |
| 2015/0201788 A1 | * | 7/2015 | Douma | A47J 27/04 99/330 |
| 2016/0037955 A1 | * | 2/2016 | Kim | A47J 27/57 99/344 |

* cited by examiner

100
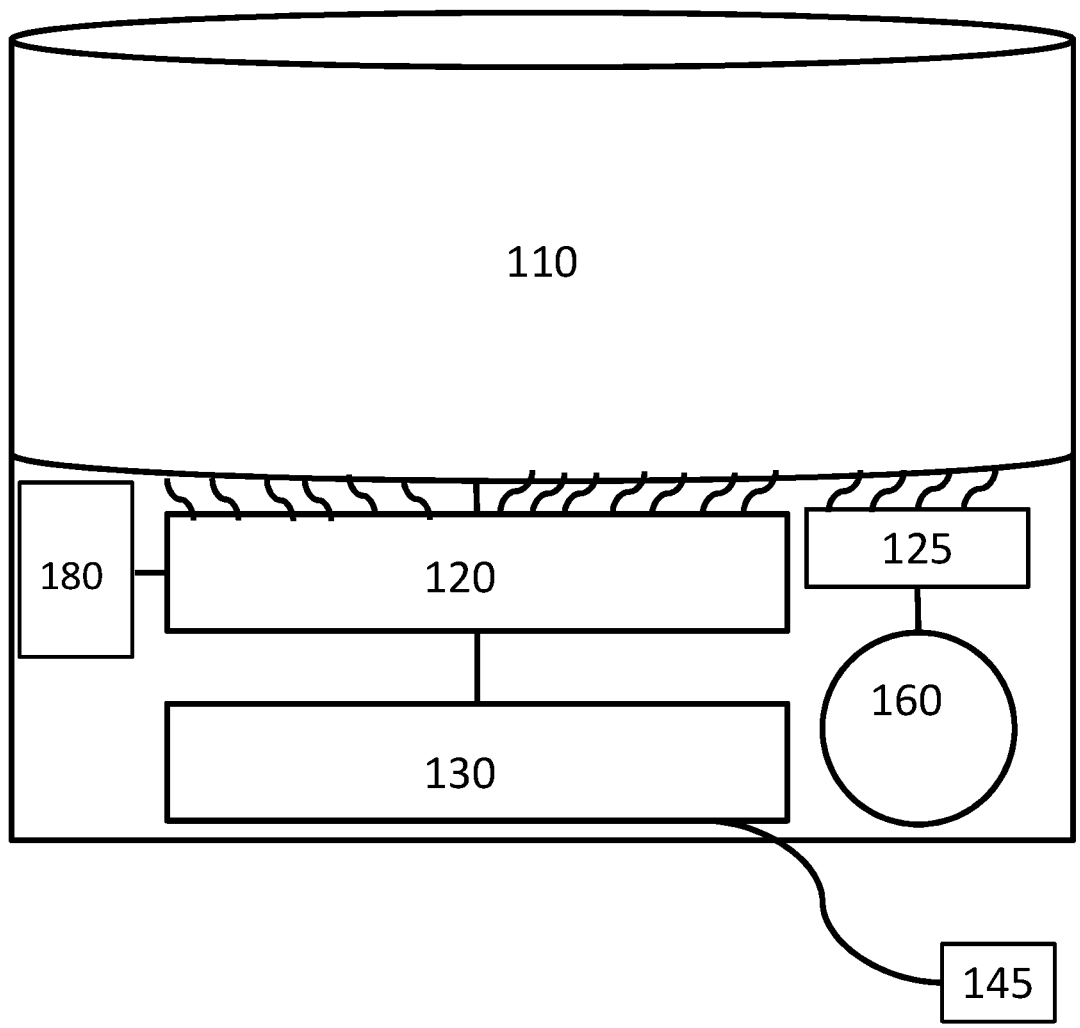

SMART SLOW COOKER

CROSS-REFERENCE TO RELATED APPLICATIONS

This non-provisional utility patent application claims the benefit of U.S. Provisional Patent Application No. 62/304,016, filed on Mar. 4, 2016, which is incorporated herein by reference.

STATEMENT REGARDING FEDERALLY SPONSORED-RESEARCH OR DEVELOPMENT

None.

FIELD OF THE INVENTION

The invention relates generally to the field of electro-mechanical apparatuses, systems and methods, and, more particularly, to a smart slow cooker system and related method.

BACKGROUND

Slow cookers, also known as electric crock pots, have gained popularity in recent years spurred in part by a growing return to home-cooking that is hampered by busy lifestyles. Traditional slow cookers are well known in the art to provide the convenience of placing uncooked ingredients in the cooking vessel, setting the temperature and cook time, and forgetting it until you return home from work later in the day.

Recent Food and Drug Administration (FDA) regulations have added a requirement that food in a slow cooker must reach 50° C. within two hours of operation in order to prevent bacterial growth in the uncooked food. Some attempts in the art aimed at meeting this requirement include increasing the heating power of the slow cooker. Attempts such as this are ineffective solutions because, counter to the intent and object of using a slow cooker, this increase in power causes the food to overcook resulting in food that is tough, dry, and undesirable.

In light of this safety-related FDA regulation, there exists a need in the art for a slow cooker apparatus, system and related method that is adapted to meet the safety requirement to prevent bacteria growth, but also will not overcook or dry out the food. Therefore, it would be desirable to have a slow cooker system and related method that heats the food to the required safe temperature within the specified time, and then changes the power driving the heating element to a lower wattage which will not overcook the food.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

In this specification where a document, act, or item of knowledge is referred to or discussed, this reference or discussion is not an admission that the document, act, or item of knowledge or any combination thereof was at the priority date, publicly available, known to the public, part of common general knowledge, or otherwise constitutes prior art under the applicable statutory provision; or is known to be relevant to an attempt to solve any problem with which this specification is concerned.

SUMMARY

A preferred embodiment of the present invention is directed to a slow cooker system comprising a vessel component, a heating component, and a control component, where the system is adapted to heat the vessel component to the point where the food inside the vessel reaches at least 50° C. in at most two hours, then the system adjusts the power to a lower setting for the remainder of the desired cooking time. The power settings of the various components described herein can be controlled by mechanical or digital controls as may be known in the art.

Embodiments of the present invention comprise various types of control means including mechanical time controllers, mechanical temperature controllers, digital time controllers, or digital temperature controllers.

Additional embodiments of the present invention include related methods of using the disclosed systems.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

BRIEF DESCRIPTION OF THE DRAWINGS

These and other features, aspects, and advantages of the present invention will become better understood with regard to the following description, appended claims, and accompanying drawings where:

FIG. 1 is a simplified block representation of an embodiment of the present invention.

DESCRIPTION

In the Summary above, in the Description below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, structures, steps, etc. are optionally present. For example, an article "comprising" (or "which comprises") components A, B, and C can consist of (i.e., contain only) components A, B, and C, or can contain not only components A, B, and C, but also one or more other components or structures.

The term "at least" followed by a number is used herein to denote the start of a range beginning with that number (which may be a range having an upper limit or no upper limit, depending on the variable being defined). For example, "at least 1" means 1 more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40% means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

Before describing in detail embodiments that are in accordance with the present invention, it should be observed that some of the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

While the specification will conclude with claims defining the features of embodiments of the invention that are regarded as novel, it is believed that the invention will be better understood from a consideration of the following description in conjunction with the figures, in which like reference numerals are carried forward.

Referring to the figures in general, and to FIG. 1 in particular, we describe a preferred embodiment of the present invention that is directed to a slow cooker 100 comprising a vessel component 110, a heating component 120, and a control component 130 connected to a power source 145, where the slow cooker 100 is adapted to heat the vessel component 110 to the point where the food inside the vessel 110 reaches at least 50.degree. C. in at most two hours, then the control component 130 adjusts the power to a lower setting for the remainder of the desired cooking time. The power settings of the various components described herein can be controlled by mechanical or digital controls as may be known in the art.

In one embodiment, the system further comprises a mechanical timer component 160 and an additional, parallel heating circuit 125, where the mechanical timer component 160 is configured to control the parallel heating circuit 125.

A method related to this system embodiment comprises the following method steps, whereby the slow cooker system heats the food in accordance with FDA requirements then continues in normal operation: At the beginning of the cooking interval, the parallel heating circuit 125 turns on in addition to the main heating component 120. At the same or similar time, the mechanical timer component 160 begins counting down a pre-set time interval. When the mechanical timer component 160 reaches the end of the pre-set time interval, the parallel heating circuit 125 is turned off and the main heating component 120 continues in normal operation as is known in the art.

In a second embodiment, the system further comprises a mechanical temperature sensor component 180 with a predetermined closed state and a predetermined open state, and an additional heating component 125. The mechanical temperature sensor component 180 is configured to be in thermal contact with the vessel component 110 and is connected in parallel to the main heating component 120.

A method related to this system embodiment comprises the following method steps, whereby the slow cooker system heats the food in accordance with FDA requirements then continues in normal operation: When the temperature sensor component 180 is in the closed state, power will run through the additional heating component 125, thereby accelerating the heating of the vessel 110 and the food within it. When the temperature sensor 180 reaches the open state, power will not run through the additional heating component 125 and the slow cooker system continues in normal operation as is known in the art.

In a third embodiment, the system further comprises a digital time control component 160. Using a digital controller as is known in the art, a timer 160 can be used to change cooking power after a predetermined amount of time. In this embodiment, the digital time control component 160 is configured to control power to the heating component 120.

A method related to this system embodiment comprises the following method steps, whereby the slow cooker system heats the food in accordance with FDA requirements then continues in normal operation: The digital time controller 160 in combination with a secondary heating circuit 125, utilizes a relay to activate the second heating circuit 125 during an initial time period and then turn off the secondary heating circuit 125 when the predetermined time interval is completed.

Another method related to this system embodiment comprises the following method steps, whereby the slow cooker system heats the food in accordance with FDA requirements then continues in normal operation: The digital time controller 160 utilizes a solid state relay, triac or other solid state device to control the average voltage delivered to the heating component 120 by pulsing the heating component 120 on and off at predetermined intervals. Based on the percent of time an average voltage can be achieved which controls the wattage level in order to meet the FDA food safety requirement, then return the slow cooker system to normal operation for the remainder of the cooking time.

In a fourth embodiment, the system further comprises a digital temperature controller component in conjunction with a temperature sensor component.

A method related to this system embodiment comprises the following method steps, whereby the slow cooker system heats the food in accordance with FDA requirements then continues in normal operation: the system is configured so that the digital temperature controller component monitors the temperature as read by the temperature sensor component and adjusts the power to the heating component in order to achieve the at least 50° C. within at most two hours requirement, then adjust the power the heating component in accordance with the desired cooking mode.

It is understood that the variations and options disclosed above with respect to the components of the apparatus embodiments, are also applicable as variations and options with respect to the components for the system embodiments.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in the claims.

The invention claimed is:

1. A slow cooker system comprising:
   a vessel adapted to contain an amount of a food, wherein said vessel is thermally conductive;
   a temperature sensor component communicative with the vessel;
   a first heating element operatively communicative with a digital time controller;
   a second heating element operating in parallel with the first heating element;

wherein the first and second heating elements are thermally communicative with the vessel;

a timer component counting down a pre-set time interval; and the digital time controller connected to a power source and comprising a solid state device controlling an average voltage delivered to the second heating element, the digital time controller performing:

activating both the first and second heating elements at a beginning of a cooking cycle with a pre-determined cooking time;

pulsing the second heating element on and off at predetermined intervals to ensure that the amount of food in the vessel is heated to a pre-set temperature within the pre-set time interval that is less than the pre-determined cooking time;

wherein the pulsing is based upon a percent of time an average voltage can be achieved to control a wattage level; and based upon the timer component reaching an end of the pre-set time interval, de-activating the second heating element to lower the cooking power, while the first heating element remains in operation for a remainder of the pre-determined cooking time.

2. The slow cooker system of claim 1 wherein the pre-set time interval and the pre-set temperature are set in accordance with FDA requirements.

3. The slow cooker system of claim 1 wherein the digital time controller de-activates the second heating element based upon the temperature sensor reaching the pre-set temperature.

4. The slow cooker system of claim 1 wherein the temperature sensor is a mechanical temperature sensor with a predetermined closed state and a predetermined open state.

5. The slow cooker system of claim 1 wherein the timer component is a mechanical timer component.

6. The slow cooker of claim 1 wherein the digital time controller uses a relay to activate the second heating element during the beginning of the cooking cycle, then turn off the second heating element when the time is up.

* * * * *